United States Patent
Kershbaumer et al.

(10) Patent No.: US 10,891,832 B2
(45) Date of Patent: Jan. 12, 2021

(54) SYSTEM AND METHOD FOR TRACKING MACHINE USE

(71) Applicants: James J. Kershbaumer, Langhorne, PA (US); James Peter Kershbaumer, Langhorne, PA (US)

(72) Inventors: James J. Kershbaumer, Langhorne, PA (US); James Peter Kershbaumer, Langhorne, PA (US)

(*) Notice: Subject to any disclaimer, the term of this patent is extended or adjusted under 35 U.S.C. 154(b) by 0 days.

(21) Appl. No.: 16/587,278

(22) Filed: Sep. 30, 2019

(65) Prior Publication Data
US 2020/0320832 A1 Oct. 8, 2020

Related U.S. Application Data

(60) Provisional application No. 62/830,761, filed on Apr. 8, 2019.

(51) Int. Cl.
| | | |
|---|---|---|
| *G07F 17/38* | (2006.01) | |
| *H03K 21/00* | (2006.01) | |
| *G06Q 20/32* | (2012.01) | |
| *G07F 17/32* | (2006.01) | |
| *A63D 15/00* | (2006.01) | |

(52) U.S. Cl.
CPC ............ *G07F 17/38* (2013.01); *A63D 15/00* (2013.01); *G06Q 20/325* (2013.01); *G07F 17/3234* (2013.01); *H03K 21/00* (2013.01)

(58) Field of Classification Search
CPC ..... G07F 17/38; G07F 17/3234; A63D 15/00; G06Q 20/325; H03K 21/00
USPC .......................................................... 463/29
See application file for complete search history.

(56) References Cited

U.S. PATENT DOCUMENTS

| | | | | |
|---|---|---|---|---|
| 3,444,974 A | * | 5/1969 | Green ................... | G07F 17/38 194/240 |
| 2005/0215317 A1 | | 9/2005 | Gramstrup | |
| 2009/0131186 A1 | | 5/2009 | Martin et al. | |
| 2009/0170602 A1 | * | 7/2009 | Martin ................... | G07F 17/32 463/39 |
| 2013/0190078 A1 | * | 7/2013 | Goto .................. | G07F 17/3225 463/25 |

FOREIGN PATENT DOCUMENTS

GB 2565416 A 2/2019

OTHER PUBLICATIONS

PCT/US2020/026993—International Search Report and Written Opinion—dated Jul. 9, 2020.

* cited by examiner

*Primary Examiner* — Allen Chan
(74) *Attorney, Agent, or Firm* — Ellenoff Grossman & Schole LLP; James M. Smedley; Alex Korona

(57) ABSTRACT

A tracking apparatus for a machine having an operation assembly is disclosed. The tracking apparatus has an electric relay configured to be connected to the operation assembly, a tracking device that is connected to the electric relay, and an electronic payment device that is connected to the electric relay. The electric relay is configured to transfer a first electrical pulse from the operation assembly to the tracking device. The electric relay is configured to transfer a second electrical pulse from either the electronic payment device or the operation assembly to the tracking device. The relay transfers the first electrical pulse or the second electrical pulse when the operation assembly performs an operation.

20 Claims, 6 Drawing Sheets

SYSTEM AND METHOD FOR TRACKING MACHINE USE

CROSS-REFERENCE TO RELATED APPLICATIONS

This application claims the benefit of the following provisional application: 62/830,761 filed Apr. 8, 2019, the entire disclosure of which is incorporated herein by reference.

TECHNICAL FIELD

The present disclosure is directed to a system and method for tracking, and more particularly, to a system and method for tracking machine use.

BACKGROUND OF THE DISCLOSURE

Conventional pool tables such as Diamond pool tables typically include a switch for free play (e.g., payment features are disabled such as during league play) that operates based on initiation via a key. When a pool table switches to free play mode, though, there is no efficient way to track how many games have been played or if the key has been operated to turn off free play at an appropriate time (e.g., when free play is designated to end such as after a pool league time period for pay is over). Also, there is no efficient way to audit the time and/or cash or other payment that goes into the pool table (e.g., whether the play was pay play or free play).

Some conventional pool tables such as Valley, Dynamo, Great American, and other pool table manufactures include side doors where a complete set of pool balls is visible in the table to a user before that user puts his or her money into the table (e.g., to vend) and to drop the pool balls to start a pool game. During periods of designated free play (e.g., when a pool league night occurs), an operator (e.g., a bar owner) typically uses 2 keys to take the side door off each table designated for free play so that pool league players play for free (e.g., or at least do not provide payment to the table). If the door that is removed is not replaced again and locked, then anyone can play for free on the table (until the door is placed back on and locked in place). Accordingly, an amount of free play typically occurs before and after designated free play times such as designated league play times, as the door is typically removed some time before free play is to begin and is typically replaced some time after free play ends. As a result, vendors lose payments that might have been received based on the extended free play times involved with removing and replacing the doors.

Conventional pool tables and techniques also involve additional costs incurred based on typical free play (e.g., league play) operation. Operators may have to cover pool tables (e.g., repair or replace covers) and maintain (e.g., repair and replace) rubber cushions of conventional tables based on excessive game play and use of tables that occurs during free play such as league play. For example, additional repair, maintenance, and part replacement is caused based on significant amounts of table use that occurs during free play such as league play. Although operators such as bar owners may make up the increased cost of repair and maintenance by selling food and drinks to league customers, the additional costs reduce profits made by operators.

Some conventional pool tables such as tables manufactured by Valley and Dynamo attempt to control free play such as by pool leagues. These tables included a motor with a small electronic board and a bill verifier. This type of table is programmed to open the window described above for free play such as during pool league play. However, because pool league times constantly change and players often demand practice time, the windows are typically not opened at desired times. As a result, free play may not occur at or may exceed the designated times using the conventional tables. Also, once the pool table opens for free play, there is still no efficient way to track how many games are played using conventional pool tables and techniques. Also, the bill verifier installed on the conventional table uses a significant amount of battery power and typically runs out of power before it can be recharged. When the battery lacks sufficient power or charge, the window described above may open or fall off and free play may occur on the table. Alternatively, to keep the battery charged, a power cord is typically run across a floor, which presents an undesirable obstruction or tripping hazard to players.

Accordingly, conventional pool tables and techniques do not efficiently and effectively track pool league play and do not control a period of time of free play (when and how long). Also, conventional pool tables and techniques do not control how many games of pool are actually played during free play such as league play.

Also in the area of automated teller machines (ATMs), machines have flaws that create variabilities for employee theft and removal of ATMs from locations (e.g., employee unauthorized vault access). Locations at which ATMs are installed also pose a risk of theft when a loss of power or electricity occurs at the location. For example, when an ATM company sends an employee to fill an ATM, conventional systems do not provide a way to track (e.g., exactly track) when that employee arrived or left the location.

The exemplary disclosed system and method of the present disclosure is directed to overcoming one or more of the shortcomings set forth above and/or other deficiencies in existing technology.

SUMMARY OF THE DISCLOSURE

In one exemplary aspect, the present disclosure is directed to a tracking apparatus for a machine having an operation assembly. The tracking apparatus includes an electric relay configured to be connected to the operation assembly, a tracking device that is connected to the electric relay, and an electronic payment device that is connected to the electric relay. The electric relay is configured to transfer a first electrical pulse from the operation assembly to the tracking device. The electric relay is configured to transfer a second electrical pulse from either the electronic payment device or the operation assembly to the tracking device. The relay transfers the first electrical pulse or the second electrical pulse when the operation assembly performs an operation.

In another aspect, the present disclosure is directed to a method. The method includes providing an operation assembly of a game machine, connecting an electric relay to the operation assembly, connecting a tracking device to the electric relay, and connecting an electronic payment device to the electric relay. The method also includes transferring a first electrical pulse from the operation assembly to the tracking device via the electric relay, transferring a second electrical pulse from either the electronic payment device or the operation assembly to the tracking device via the electric relay, and transferring the first electrical pulse or the second electrical pulse when the operation assembly releases at least one playing object of the game machine.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

DETAILED DESCRIPTION AND INDUSTRIAL APPLICABILITY

The exemplary disclosed system and method may include a component and/or application (e.g., app such as a Pay Range app) that may be operably connected (e.g., hooked up) to any pay pool table such as a coin-operated pool table (e.g., coin-operated Diamond pool table or other suitable mechanical pool table). In at least some exemplary embodiments, the component and/or application may be any suitable payment network component and/or application for coin-operated machines. For example, the exemplary component and/or application may be a Pay Range Blue Key Plus component and relay board. Also for example, the exemplary disclosed system and method may include a universal board (e.g., a BarZcash Universal Board) for connecting any suitable component (e.g., a beacon, a debit/credit card readers, or a Near Field Communication receivers) to any suitable machine.

Figure 1:
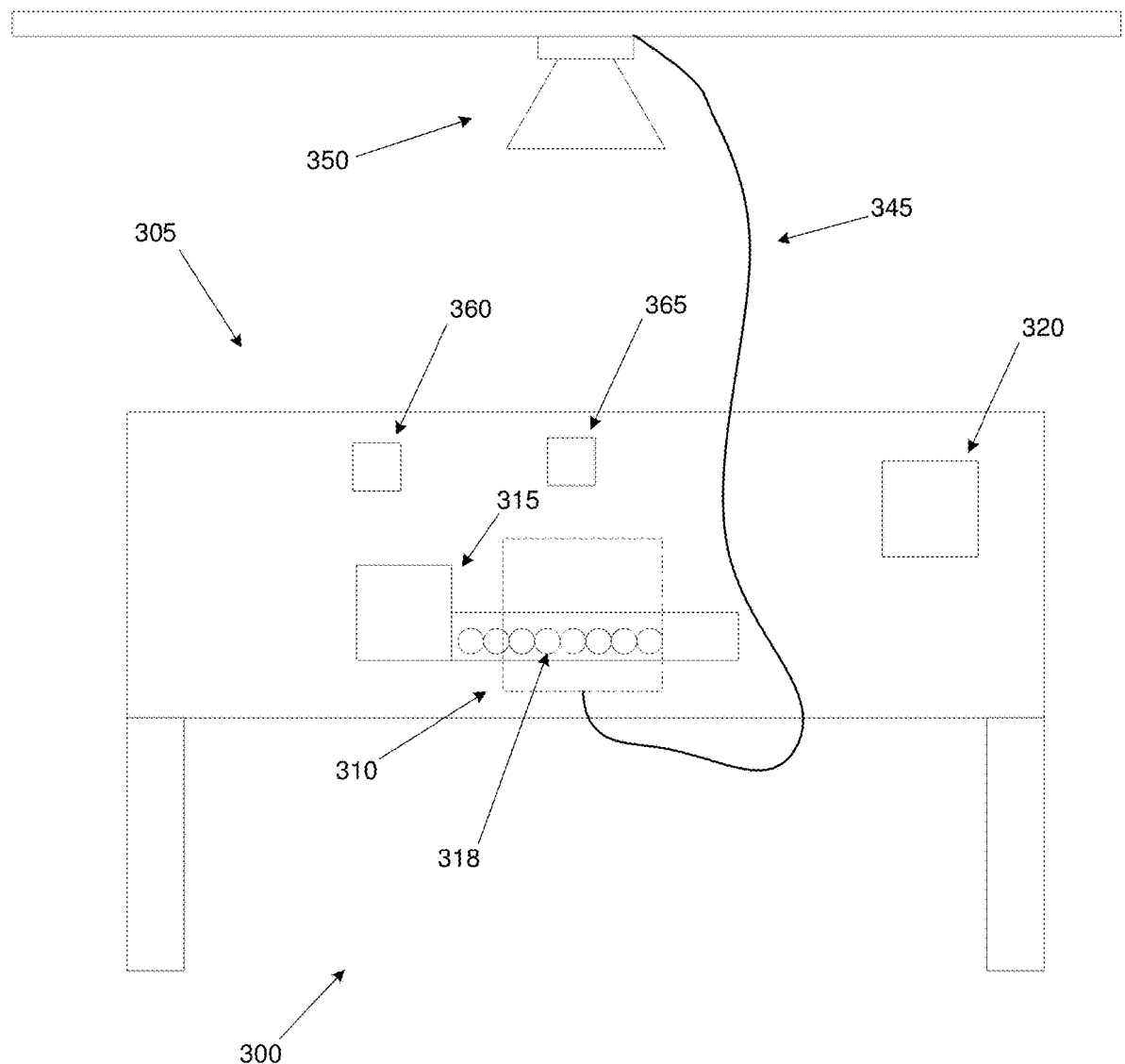
FIG. 1 is a schematic illustration of an exemplary embodiment of the present disclosure.

In at least some exemplary embodiments and as illustrated in FIG. 1, an exemplary system 300 may include a machine 305 and a tracking system 310. Tracking system 310 may track a use (e.g., machine use) of machine 305. For example, tracking system 310 may track a number of times and/or a length of time machine 305 is used, an amount of money paid to machine 305 (e.g., by coin, currency, or electronic payment as described for example herein), an amount of material or goods dispensed by machine 305, and/or any other suitable measure of an operation of machine 305. Tracking system 310 may be disposed within and/or on machine 305. In at least some exemplary embodiments, tracking system 310 may be disposed partially or substantially entirely within machine 305.

In at least some exemplary embodiments, the exemplary disclosed machine (e.g., machine 305) may be a coin-operated and/or bill-operated device such as a pool or billiards table, an arcade or game center device (e.g., air hockey or any other desired machine), a machine for shaping and stamping coins (e.g., souvenir penny), a laundry machine, gambling machine such as a slot machine, and/or any other desired machine that may operate based on inserting coins, bills, or other forms of payment (e.g., electronic payment). The exemplary disclosed machine may also be a machine used for efficient parking at stadiums, arenas, parking garages, designated municipal parking, and/or other suitable locations for parking vehicles. For example, a parking gate may be raised once the exemplary disclosed system or machine receives data that a fee was paid to park. The exemplary disclosed machine may also be an automated teller machine (ATM).

Machine 305 may include an operation assembly 315. Operation assembly 315 may be any suitable assembly that performs an operation of machine 305 such as, for example, an assembly that drops or provides a play ball or balls, dispenses a material, good, or product, provides an interaction with a user, allows a user to utilize or play machine 305, and/or any other suitable operation. Operation assembly 315 may release one or more objects 318 (e.g., from a cavity of machine 305). Object 318 may be any suitable object such as a ball (e.g., a pool ball) or any other suitable playing object, a product (e.g., such as a vending machine snack, candy, or an electronic device), material, fluid such as a brewed beverage, currency or money, or any other desired object. For example, operation assembly 315 may be a switch of a pool table that releases or drops objects 318 that may be pool balls from a cavity of machine 305 for playing a game of pool or billiards when machine 305 may be a pool table. Operation assembly 315 may be configured to receive cash (e.g., coins and/or currency such as bills). For example, operation assembly 315 may include a mechanical coin slot and/or bill receiver assembly that may be actuatable by a user. For example, a user may insert coins into operation assembly 315 and push a component in or out to insert the coins into machine 305, which may cause operation assembly 315 to operate (e.g., drop pool balls, provide a material, product, or good, allow a user to operate machine 305, and/or any other suitable operation). In at least some exemplary embodiments, operation assembly 315 may be a mechanical push slot into which a user may insert money to cause machine 305 that may be a pool machine to drop pool balls for use by players.

Figure 2:
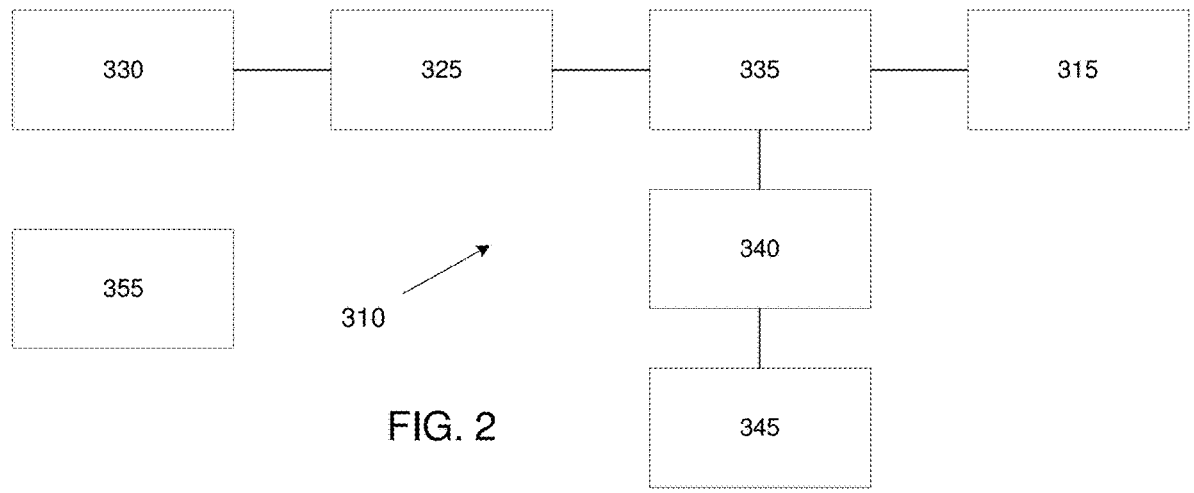
FIG. 2 is a schematic illustration of an exemplary embodiment of the present disclosure.
Figure 3:
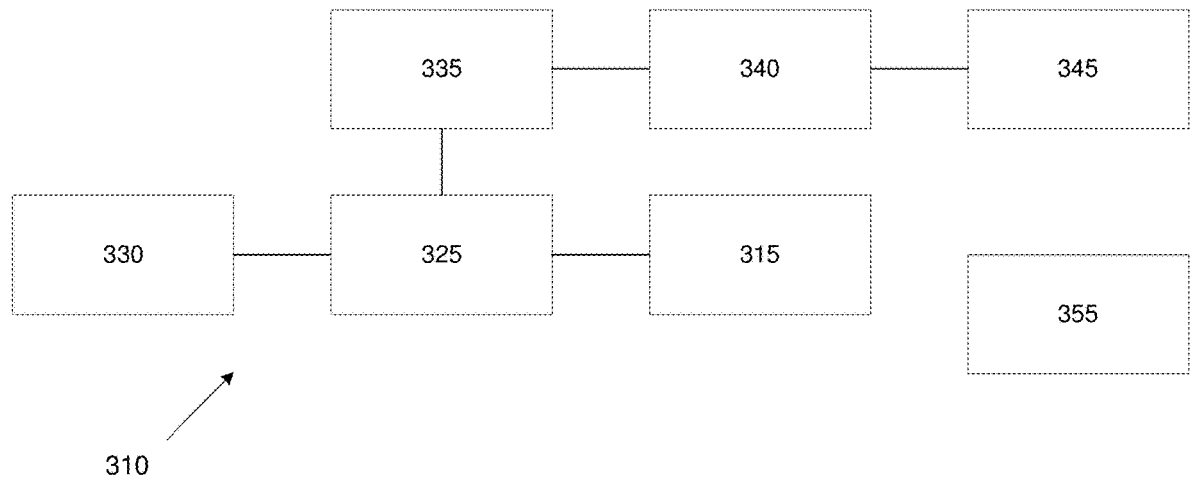
FIG. 3 is a schematic illustration of an exemplary embodiment of the present disclosure.

As illustrated in FIGS. 1-3, tracking system 310 may include a display assembly 320, a relay 325, a payment device 330, a tracking device 335, and a power storage 340. Display assembly 320, relay 325, payment device 330, and tracking device 335 may be electrically connected and/or communicate data between each other, and may be powered by power storage 340. Components of tracking system 310 may also be electrically connected and/or communicate data with components of machine 305 such as, for example, operation assembly 315. In at least some exemplary embodiments, some or all components of tracking system 310 may comprise a board (e.g., a universal board).

Relay 325 may be any suitable relay or switching device that may be selectively controlled to control an operation of tracking system 310. Relay 325 may be an electric relay. Relay 325 may be any suitable electric switching device. For example, relay 325 may be an electromagnetic relay. Relay 325 may be a solid state relay, an electromechanical relay, a hybrid relay, a reed relay, or a thermal relay. In at least some exemplary embodiments, relay 325 may be a relay assembly having any desired number of poles and throws. For example, relay 325 may include e.g., one or more single pole single throw (SPST) relays, single pole double throw (SPDT) relays, double pole single throw (DPST) relays, and/or double pole double throw (DPDT) relays. For example, relay 325 may be a double pole double throw (DPDT) relay. Relay 325 may be a relay of any desired voltage such as 5 volt, 12 volt, 24 volt, or any other desired voltage (e.g., between 9 volts DC and 24 volts DC). In at least some exemplary embodiments, relay 325 may be a DPDT 12 volt relay. Relay 325 may be a 5 volts to 24 volts DC switchable connector (e.g., that may close any suitable type of voltage to initiate an operation of machine 305). For example, relay 325 may be a universal board having coin switch inputs for machine 305 (e.g., that may be a coin switch crediting device such as a video game, pool table, or any other suitable game machine). In at least some exemplary embodiments, some or all components of tracking system 310 may comprise a board (e.g., a universal board) that may include inputs to start or credit machine 305 having an output that may close a relay. In at least some exemplary embodiments, machine 305 may have an output connection that may be connected with payment device 330 (e.g., that has a plurality of inputs such as three coin sensing inputs for a bill validator and/or coins).

Payment device 330 may be any suitable device for accepting and processing wireless payments such as, for example, payments made via a smart device (e.g., smartphone). Payment device 330 may be an electronic payment device. Payment device 330 may run software for processing electronic payments via wireless networks for facilitating payment to automated machines (e.g., machine 305). For example, payment device 330 may include a transceiver for wirelessly communicating (e.g., via Bluetooth, Wi-Fi, cellular, Near Field communication, and/or any other suitable method) with mobile devices such as smartphones or smart tablets to make payments. Payment device 330 may be electrically connected to (e.g., installed in) machine 305 to allow users to make credit card payments to utilize machine 305. Payment device 330 may include a relay board and any other suitable components for facilitating wireless payments. For example, a user may use a smartphone to make a payment (e.g., credit card or other e-banking payment) wirelessly using a smartphone or other device to machine 305 via payment device 330. In at least some exemplary embodiments, payment device 330 may be a PayRange device (e.g., a PayRange Blue Key Plus) or similar device. Components of system 300 may be operated by a user utilizing a Pay Range application (e.g., app) running on a smart device such as a smartphone or other suitable device. Payment device 330 may be a Beacon app, a debit/credit card reader, an NFC (Near field Communication) receiver, a Pay Range device (e.g., Pay Range Blue Key device), an advanced metering infrastructure device, an automatic meter reading device, or any other suitable device that may be connected to components of tracking system 310.

Tracking device 335 may be any suitable device for counting or measuring an operation of operation assembly 315, payment device 330, and/or any other desired component of system 300. Tracking device 335 may be a pool table tracking device, an automated teller machine (ATM) tracking device, or a tracking device for any other desired type of machine. Tracking device 335 may be a mechanical and/or electromechanical counter. For example, tracking device 335 may be any suitable DC (direct current) coin counter. In at least some exemplary embodiments, tracking device 335 may be a 12 volt DC coin counter or a counter of any other desired voltage (e.g., a 5 volt DC counter). Tracking device 335 may receive and/or emit electrical pulses to or from other suitable components of tracking system 310 and/or machine 305. For example, tracking device 335 may receive and/or emit DC electrical pulses (e.g., 5 volt, 12 volt, 24 volt, or any other desired voltage). Tracking device 335 may count or measure an operation of operation assembly 315, payment device 330, and/or any other desired component of system 300 based on receiving and/or emitting pulses, and thereby track or measure an operation of one or more machines 305. For example, tracking device 335 may track and measure league play and/or cash play of machines 305 that are pool tables (e.g., or any other use of machine 305 that is any suitable type of machine). Tracking device 335 may include a storage medium for storing data of measurements or counts of an operation of components of system 300 such as described herein (e.g., or may transfer data to another component of system 300 such as the exemplary disclosed controller described below or any other suitable component of system 300).

Power storage 340 may be any suitable device or assembly for storing power or energy such as a battery. For example, power storage 340 may be any suitable type of battery for powering components of tracking system 310. For example, power storage 340 may include a primary cell battery and/or a secondary cell battery. For example, power storage 340 may include a lithium battery, an alkaline battery, a nickel-cadmium battery, a zinc-carbon battery, and/or any other suitable type of battery. In at least some exemplary embodiments, power storage 340 may be a deep cell battery. In at least some exemplary embodiments, power storage 340 may be a 12 volt DC battery.

In at least some exemplary embodiments and as illustrated in FIG. 1, power storage 340 may be selectively connected to a power source 350 via a power connector 345. For example, power storage 340 may be connected to power source 350 that may be an electrical outlet (e.g., or any other suitable power source such as an engine, motor, or generator) via power connector 345 that may be an electrical wire or cable (e.g., electrical cord). In at least some exemplary embodiments, power connector 345 may be a 12 volt (e.g., or any other desired voltage) DC cable that may be disposed at a bottom of machine 305 and may be electrically connected to power storage 340 disposed in or on machine 305. Power source 350 may be a 12 volt (e.g., or any other desired voltage) DC trickle charger that may be disposed on top of a light (e.g., a pool table lamp) where for example 110 volts (e.g., or 220 volts) may already be provided for an operation of the light. Power connector 345 that may be a charging cord may be dropped down from power source 350 that may be integrated with the lamp and plugged into power storage 340 (e.g., or another component of machine 305). In at least some exemplary disclosed embodiments, this exemplary configuration may keep substantially all tripping hazards associated with system 300 off of a floor (e.g., so that custodial staff such as cleaning personnel at the end of a night after use of machine 305, e.g., game play, may avoid tripping over obstructions such as power connector 345).

FIGS. 2 and 3 illustrate exemplary embodiments of how the exemplary disclosed components of tracking system 310 may be configured and electrically connected to each other. Exemplary disclosed electrical pulses may be emitted and/or received by adjacent exemplary components and/or via other components as described for example herein. Relay 325 may electrically connect operation assembly 315, payment device 330, and/or tracking device 335. Tracking device 335 may emit and/or receive electrical pulses and/or communicate with operation assembly 315 and/or payment device 330 (e.g., and/or display assembly 320) via relay 325. Tracking device 335 may thereby count, track, and/or measure an operation of any desired component of system 300 (e.g., operation assembly 315 and payment device 330).

Display assembly 320 may be any suitable assembly or device for displaying information to users of system 300 (e.g., game players when machine 305 is a game, users when machine 305 dispenses goods, material, or currency, or any other suitable user). For example, display assembly may be a light-emitting diode (LED) or liquid crystal display (LCD). Display assembly 320 may include a plurality of LED and/or LCD lighting elements that may display information to users. In at least some exemplary embodiments, display assembly 320 may include a plurality of LED lights (e.g., any desired number such as 8, 10, 12, or other desired number).

Tracking system 310 may include electronic control systems and/or control boards. For example as illustrated in FIGS. 2 and 3, tracking system 310 may include a controller 355. Controller 355 may include for example a processor (e.g., micro-processing logic control device) or board components. Controller 355 may include input/output arrangements that allow it to be connected (e.g., via wireless and/or electrical connection such as wires or electrical lines) to other components of system 300. For example, controller 355 may control an operation of system 300 (e.g., including machine 305 and/or tracking system 310) based on user input received from one or more user interfaces (e.g., interfaces of machine 305), computer modules (e.g., in wireless and/or direct connection to machine 305 and/or tracking system 310), and/or user devices (e.g., such as smartphones have applications for operating system 300). Controller 355 may be a separate controller or may be integrated into one or more components of tracking system 310 (e.g., tracking device 335).

In at least some exemplary embodiments, some or all components of tracking system 310 may be isolated from a power source and/or wiring of machine 305 to protect against potential damage that may be caused to electronics in machine 305. For example, relay 325 may isolate voltage powering components of tracking system 310 from voltage of machine 305 to substantially prevent a short circuit or other unsuitable operation of machine 305.

In at least some exemplary embodiments, the exemplary disclosed system may include a tracking apparatus for a machine having an operation assembly. The tracking apparatus may include an electric relay (e.g., relay 325) configured to be connected to the operation assembly (e.g., operation assembly 315), a tracking device (e.g., tracking device 335) that may be connected to the electric relay, and an electronic payment device (e.g., payment device 330) that may be connected to the electric relay. The electric relay may be configured to transfer a first electrical pulse from the operation assembly to the tracking device. The electric relay may be configured to transfer a second electrical pulse from either the electronic payment device or the operation assembly to the tracking device. The relay may transfer the first electrical pulse or the second electrical pulse when the operation assembly performs an operation. The first and second electrical pulses may be 12 volt DC electrical pulses. The electric relay may be a 12 volt electric relay. The electric relay may be a double pole double throw relay. The electronic payment device may be selected from the group consisting of a PayRange Blue Key Plus device, a Pay Range Blue Key Smart device, a Touch Tunes device, and an AMI device. The electronic payment device may be connected to the electric relay via a wire being connected from a position on a relay board of the PayRange Blue Key Plus device to the electric relay. The relay board may be a Pay Range Relay Board part #8856046 and the position on the relay board may be a K1 position. The exemplary disclosed apparatus may further include a deep cell battery that may be electrically connected to the tracking device. The deep cell battery may be a 12 volt DC battery. The exemplary disclosed apparatus may also include a display board configured to be disposed on the machine, the display board including a plurality of light-emitting diodes. The tracking device may be a 12 volt DC coin counter. The tracking device may be a pool table tracking device or an automated teller machine tracking device.

In at least some exemplary embodiments, the exemplary disclosed system may include a pool ball release switch (e.g., operation assembly 315), an electric relay (e.g., relay 325) that may be connected to the pool ball release switch, a tracking device (tracking device 335) that may be connected to the electric relay, and an electronic payment device (e.g., payment device 330) that may be connected to the electric relay. The electric relay may be configured to transfer a first electrical pulse from the pool ball release switch to the tracking device. The electric relay may be configured to transfer a second electrical pulse from either the electronic payment device or the pool ball release switch to the tracking device. The relay may transfer the first electrical pulse or the second electrical pulse when the pool ball release switch releases a plurality of pool balls from a cavity of the pool table machine. The electric relay may be a 12 volt double pole double throw relay. The electronic payment device may be a PayRange Blue Key Plus device, a Pay Range Blue Key Smart device, a Touch Tunes device, or an AMI device that may be connected to the electric relay via a wire being connected from a position on a relay board of the electronic payment device (e.g., a PayRange Blue Key Plus device, a Pay Range Blue Key Smart device, a Touch Tunes device, or an AMI device) to the electric relay. The relay board may be a Pay Range Relay Board part #8856046 and the position on the relay board may be a K1 position.

The exemplary disclosed system and method may be used in any suitable application involving coin-operated and/or bill-operated machines. For example, the exemplary disclosed system and method may be used in any suitable application such as a pool table, an arcade or game center device (e.g., air hockey or any other desired machine), a machine for shaping and stamping coins (e.g., souvenir penny), a laundry machine, a gambling machine such as a slot machine, and/or any other desired machine that may operate based on inserting coins, bills, or other forms of payment. The exemplary disclosed system and method may also be used for efficient parking at stadiums, arenas, parking garages, designated municipal parking, and/or other suitable locations for parking vehicles.

Figure 4:
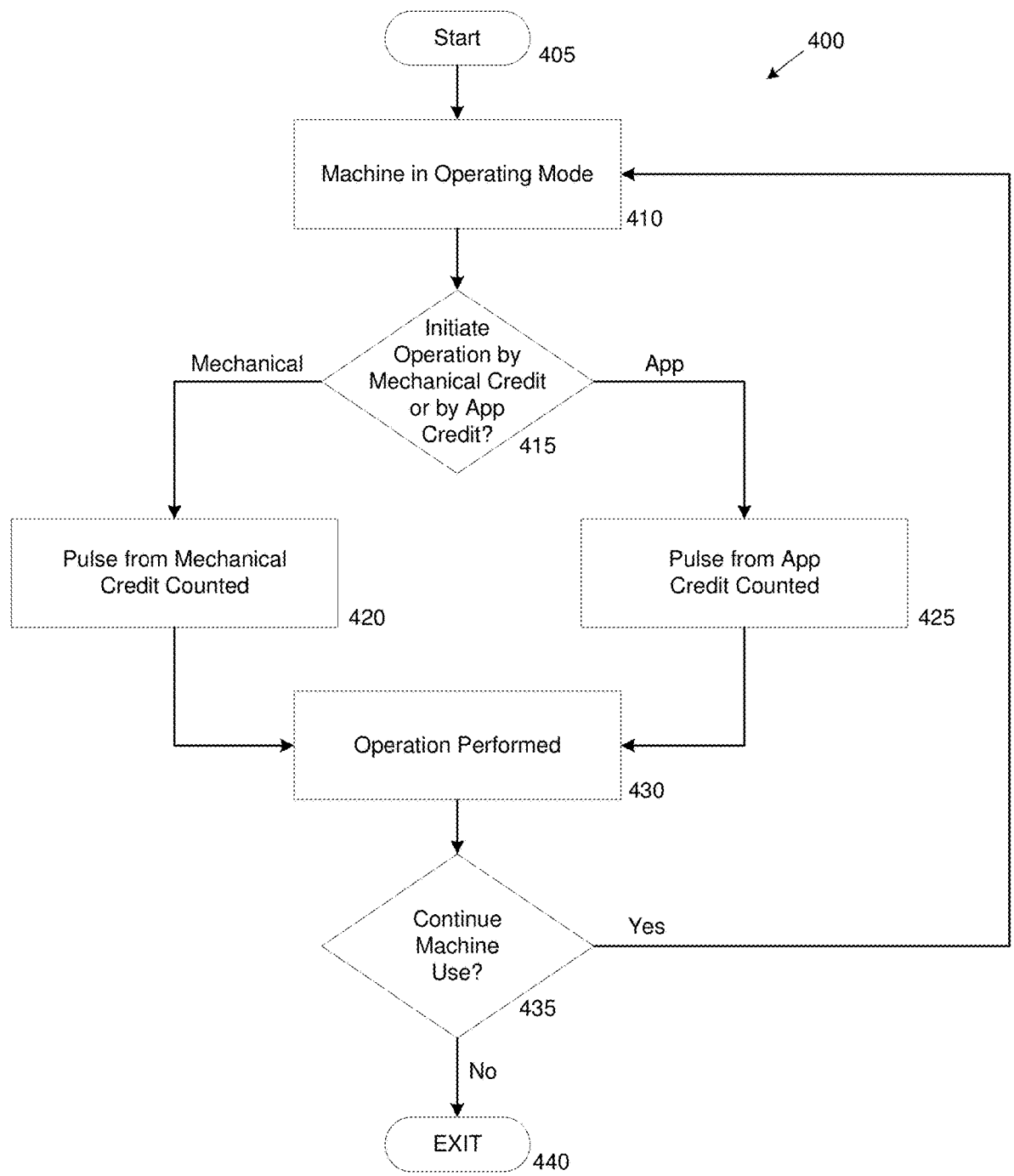
FIG. 4 illustrates an exemplary process of at least some exemplary embodiments of the present disclosure.

FIG. 4 illustrates an exemplary operation of the exemplary disclosed system 300. Process 400 begins at step 405. At step 410, system 300 may be in an operating mode. Both machine 305 and tracking system 310 may be powered on and available to receive input or interaction from users.

At step 415, an operation of machine 305 (e.g., an operation of operation assembly 315 such as dropping pool balls or an ATM operation) may be initiated. At step 415, system 300 may determine whether the operation has been initiated by a mechanical credit or an App credit (e.g., initiated using an application such as a smartphone app that may be processed via payment device 330). System 300 may determine how the operation has been initiated based on an operation of relay 325, tracking device 335, and/or controller 355, which may emit and/or receive pulses and/or pulse data from each other or other components of tracking system 310 and/or machine 305 (e.g., operation assembly 315) for example as described below. Step 415 may occur simulataneously with and/or be integrated with step 420 and/or step 425.

If system 300 determines that the operation (e.g., of operation assembly 315) has been initiated by mechanical credit, process 400 may proceed to step 420. At step 420, tracking device 335 may receive a pulse from operation assembly 315. For example when a user inserts coins or currency into operation assembly 315 and actuates operation assembly 315, operation assembly 315 may perform a desired operation (e.g., dropping pool balls) and emit an electrical pulse as described for example above (e.g., to tracking device 335 either directly or via relay 325). Tracking device 335 may measure (e.g., "count") and record data regarding the operation of operation assembly 315 (e.g., regarding any desired attribute such as the exemplary attributes described above). Process 400 may then proceed to step 430, at which the desired operation (e.g., operation of operation assembly 315) may be performed.

If system 300 determines that the operation (e.g., of operation assembly 315) has been initiated by App credit, process 400 may proceed to step 425. At step 425, tracking device 335 may receive a pulse from payment device 330 (e.g., and/or operation assembly 315). For example when a user initiates the operation for example as described above (e.g., via wireless commands provided to a smartphone or similar device), payment device 330 may emit an electrical pulse to operation assembly 315 to perform a desired operation (e.g., dropping pool balls), which may also be received by tracking device 335 either directly or via relay 325 (e.g., and/or operation assembly 315). Tracking device 335 may measure (e.g., "count") and record data regarding the operation of operation assembly 315 (e.g., regarding any desired attribute such as the exemplary attributes described above) and/or payment device 330. Process 400 may then proceed to step 430, at which the desired operation (e.g., operation of operation assembly 315) may be performed.

At step 430, the desired operation such as dropping of pool balls, a game ball being provided, a material or good being dispensed, or any other desired operation based on a purpose of machine 305 may be performed. In at least some exemplary embodiments, users may perform an activity (e.g., play a game) based on the operation. For example, pool players may shoot the balls that were dropped or released at step 430 into pockets of machine 305 that may be a pool table. For example objects 318 (e.g., pool balls) may be returned to the exemplary disclosed cavity of machine 305 described above.

System 300 may then proceed to step 435, at which system 300 may determine whether use of machine 305 will continue and whether machine 305 will remain in an operating mode based for example on user input, input from an owner and/or operator of machine 305 or property on which machine 305 is located, an algorithm or predetermined criteria provided to or by controller 355, machine 305 and/or tracking system 310 being physically powered off, and/or any other suitable input, criteria, conditions, or action. If system 300 determines that machine 305 will remain in use, process 400 may return to step 410. If system 300 determines that machine 305 will not remain in use, process 400 may proceed to step 440, at which process 400 ends.

Process 400 may involve any desired number of tracking systems 310 and/or machines 305. In at least some exemplary embodiments, a single tracking system 310 may track or monitor a single machine 305 or a plurality of machines 305. Also for example, a plurality of tracking systems 310 may track or monitor a single machine 305 or a plurality of machines 305. Data measured and stored by any desired number of tracking systems 310 regarding any desired number of machines 305 may be combined, analyzed, and/or processed by system 300 as desired. For example, data from one or more tracking systems 310 may be processed by system 300 to provide analysis results for one or more machines 305 such as number of operations, time of machine use, revenue, and/or other data by machine 305, location, and/or any other desired parameter. For example, system 300 may provide data and analysis regarding how machine 305 is utilized during free play or league play when machine 305 is a pool table. System 300 may utilize artificial intelligence or machine learning techniques (e.g., as described below) in analyzing the data recorded and/or processed by tracking system 310 (e.g., by tracking device 335).

In at least some exemplary embodiments, operation assembly 315 may pulse tracking device 335 and/or payment device 330. The pulsing may be used for audits using tracking device 335 (e.g., secondary) located in the machine (e.g., machine 305 such as a pool table). A component of machine 305 such as operation assembly 315 (e.g., a pool table harness of a Diamond pool table or other desired machine) may be re-wired to relay 325 (e.g. a Double Pole Double Throw 12 volt relay), which may trip tracking device 335 to cause operation assembly 315 to operate (e.g., to drop pool balls or take any other desired action). Any desired pulse (e.g., voltage amount such as 12 volts) may pull relay 325 by either a mechanical credit (e.g., as described above regarding step 420) or an App credit (e.g., as described above regarding step 425).

Tracking system 310 may be installed on and/or within machine 305 using new wiring and adding power storage 340 and relay 325. For example, one or more components of machine 305 may be modified. In at least some exemplary embodiments, payment device 330 (e.g., including a part such as a Pay Range Relay Board part #8856046) may be modified to operate with relay 325 (e.g., a 12 volt relay). For example, a relay of payment device 330 (e.g., a relay disposed at a Pay Range relay board location K1) may be removed. The installation may include jumping a 12 volt DC to pulse wires of payment device 330 (e.g., on a PayRange relay board) to relay 325. In at least some exemplary embodiments, a board (e.g., pulse board such as a Blue Key pulse board) may be modified to take 12 volts off of the K1 location to send to a plurality of relays (e.g., via relay 325 to three different relays) to initiate an operation of operation assembly 315 of machine 305 while maintaining an isolation of voltages (e.g., isolating a voltage of tracking system 310 from a voltage of machine 305).

In at least some exemplary embodiments, by being able to control some or all free play games and/or paid play games using the exemplary disclosed system and method, operators of the system may track game play and charge fees for events such as pool league night. Also with the capability of tracking device 335 (e.g., counter such as a 12 volt coin meter), system 300 may track and record data each time a game is initiated (e.g., every time the pool balls drop for a pool game).

In at least some exemplary embodiments, a given machine 305 may collect money, which may include ACH operators sharing from a bank account associated with a given location of machine 305. System 300 may also track the amount of free games that are being played.

In at least some exemplary embodiments, the exemplary disclosed method may include providing an operation assembly (e.g., operation assembly 315) of a game machine, connecting an electric relay (e.g., relay 325) to the operation assembly, connecting a tracking device (e.g., tracking device 335) to the electric relay, connecting an electronic payment device (e.g., payment device 330) to the electric relay, transferring a first electrical pulse from the operation assembly to the tracking device via the electric relay, transferring a second electrical pulse from either the electronic payment device or the operation assembly to the tracking device via the electric relay, and transferring the first electrical pulse or the second electrical pulse when the operation assembly releases at least one playing object of the game machine. The operation assembly may include a pool table switch that releases at least one playing object that may be a plurality of pool balls of the game machine that is a pool table. The operation assembly may include a mechanical push slot of the game machine that is a pool table. The exemplary disclosed method may further include connecting a battery to the tracking device, and selectively connecting the battery to an electrical outlet via an electrical wire.

In at least some exemplary embodiments, the exemplary disclosed system and method may operate with any suitable machine 305 (e.g., a Diamond pool table or any other suitable mechanical commercial pool table). Paid advertisements (e.g., ads) may be sold based on an operation of system 300 (e.g., via a network that interfaces with users such as the Internet). The exemplary disclosed system may also set a relatively cheaper game rate for pool league players to start games during league play (e.g., or have a sponsor that puts an ad on the app when they start the game to pay a portion of the fee). For example, pool league players may also pay a weekly fee that may give the players a certain number of free games per week using system 300. An operator of the exemplary disclosed system and method may also share some of the fees with an owner of a facility in which machines 305 are located (e.g., a bar room owner). The exemplary disclosed system and method may control the percentage of all fees via input provided by an operator and/or a predetermined operation (e.g., including machine learning operations as described below). For example, machines 305 (e.g., pool tables) at pool league locations (e.g., bars) may provide league players with practice time during slow business hours for free (e.g., hours during which a given location is typically slow or not crowded).

In at least some exemplary embodiments, the exemplary disclosed system and method (e.g., including Pay Range) may work with machines 305 such as pool tables, with a push message being selectively sent to an operator of the exemplary disclosed system and a location owner (e.g., location where one or more machines 305 are located) to plug in machine 305 (e.g., a pool table) so that power storage 340 powering tracking device 335 may not run out of power (e.g., will not run down).

In at least some exemplary embodiments, the exemplary disclosed system and method may track, audit, manage, and control league play. Operation assembly 315 that may switch an operation of machine 305 (e.g., a pool table) between free play and paid play may be disconnected and side door pool table keys may not be given out to control an opening and closing of a window to machine 305 (e.g., window to access pool balls). Accordingly, machine 305 may not be physically switched to a free play mode in some cases. Also for example if operation assembly 315 (e.g., a coin mechanism) breaks or jams, machine 305 (e.g., a pool table) may still be started using the exemplary disclosed component or application (e.g., including a PayRange app). This may save an immediate service call from being requested, and machine 305 (e.g., pool table) may remain in operation.

In at least some exemplary embodiments, the exemplary disclosed system and method may provide output and receive input from a system operator, a location owner of machine 305 (e.g., bar owner), and/or players via any suitable user interface as described for example herein. For example, users may access the system using a smartphone app. In at least some exemplary embodiments, the exemplary component or application (e.g., Pay Range) may use an internet connection via a mobile phone to operate (e.g., and/or any other suitable network connection as described for example below). For example, the exemplary disclosed system and method may operate using computing devices and networks similar to the exemplary devices and networks described below regarding FIGS. 5-7.

In at least some exemplary embodiments, the exemplary disclosed system and method may include using relay 325 that may be 12 volts DC and may be used on any suitable mechanical machine such as a game machine (e.g., pool table, arcade game, or other suitable game).

In at least some exemplary embodiments, the exemplary disclosed system and method may charge pool league players a fee each week so that the players may start their pool league games and practice when desired (e.g., at predetermined and/or flexible times) each week. Also for example, the exemplary disclosed system and method may set how many games each league player may initiate (e.g., start) each week by charging a fee when desired (e.g., a small fee each week).

In at least some exemplary embodiments, the exemplary disclosed system and method may include a waiting list feature. For example, an exemplary application (e.g., app) utilized by users may allow for a plurality of people (e.g., five people or any other desired number of people) to wait to play pool on an exemplary machine (e.g., machine 305). For example, a user may pay to play on machine 305, and the system may place them on a waiting list. The exemplary system may alert a user that machine 305 is available to play pool via the app (e.g., via an exemplary user interface as described for example herein that may run the app). For example, a user may initiate play on machine 305 via an exemplary user interface (e.g., via an app of a smartphone).

In at least some exemplary embodiments, the exemplary disclosed system and method may be used for pool tables or laundry machines. If a first user is using an exemplary machine (e.g., machine 305 such as a pool table or a laundry machine), a second user would not be able to utilize the system to initiate an operation of the machine.

For example, a user who wants to play machine 305 next or reserve a turn in-line on an exemplary machine (e.g., pool table or laundry machine) may use a user interface (e.g. running an app) to choose the exemplary waiting list feature. The user may use the app to swipe up on the waiting list, which may result in a code being sent back by the system to their user interface (e.g., smartphone). The exemplary code may work once a prior code (e.g., code of a prior user) has been used. If no other user is in front of the waiting user (e.g., on the waiting list) and other users are utilizing a machine, then the exemplary code may be able to be used as soon as the users in front of the waiting user(s) are finished using the machine. For example, some or all other codes may be inactive until the code in front of the waiting user is used. The exemplary system may allow users to fairly and correctly maintain an order of use of the exemplary machine (e.g., machine 305).

In at least some exemplary embodiments, the exemplary disclosed system may include an imaging device such as a monitor (e.g., similar to display assembly 320). The monitor may for example display a user who is next (e.g., users in a location such as a bar or laundromat may look at the monitor to see who is next). For example, a wiring of the exemplary disclosed system used to start the exemplary machine (e.g., machine 305) may be disconnected (e.g., Blue Key voltage may be disconnected using the exemplary disclosed wiring of an exemplary relay until a user pushes a start button). The exemplary machine could include instructions located by a light switch indicating to press "end game" to start the exemplary app described for example herein. Users may for example self-police use of the exemplary system described above. For example, users located near the exemplary machine may notice a light on the exemplary machine that may light up (e.g., light up brightly and/or flash), thereby indicating to nearby users to push the button to start the exemplary app to start the next game (e.g., or next use of the exemplary machine). The app may for example indicate that the exemplary machine is unavailable until the end game button is pressed by a user. The exemplary machine may also include instructions (e.g., located in the app) to check that the end game button was pushed. Once the Blue Key voltage is reconnected (e.g., back online) the next play in the exemplary waiting list may be accepted to swipe the app to start. The exemplary machines (e.g., machine 305) may also use a laser to detect a cue ball when machine 305 is a pool table. The exemplary system may include a second laser to detect an 8 ball and trip the Blue Key voltage back on if appropriate based on game play. The exemplary disclosed system may for example use latching relays to complete these transactions.

In at least some exemplary embodiments, the exemplary disclosed system and method may include display assembly 320 that may be a challenger control board and challenger player unit. Display assembly 320 that may be a challenge board may be mounted to an outside of machine 305 (e.g., a pool table exterior) in a metal housing. Display assembly 320 may have eight LED lights numbered from one to eight (e.g., single LED for 8, 9, and 10 ball forgiveness, and two low battery LEDs for D cell and main battery). Display assembly 320 that may be a challenge board player unit may also be used on other types of machines such as Fosse ball tables, Shuffle Board tables, dart boards, and dart machines to keep an order of players or similar games that involve maintaining a player order. Display assembly 320 that may be a Challenger Player unit may also be installed on any mechanical pool table such as Diamond, Valley, Dynamo, Brunswick, and Global pool tables.

In at least some exemplary embodiments, display assembly 320 that may be a challenge board may provide a Straight Pool Setting. For example, when a player inserts quarters or uses an app to pay as described for example above, vending Challenger LED 1 may light up solid. If no time play is set up on machine 305 that may be a pool table, then the LED will remain solid until someone puts money back in. When a first player ends his or her game, the next player may insert money or app credits. The Player 1 LED may then turn off (e.g., go out) and the player 2 LED may light up. There may be a 20 minute reset time (or other desired time). After 20 minutes, the LED for player 2 may go out. This may prevent power storage 340 (e.g., a battery) from being drained.

In at least some exemplary embodiments, display assembly 320 that may be a challenge board may provide timed pool settings. These settings involving timed play may make the LED Challenger LED lights operate differently. Money or an app may cause operation assembly 315 to activate to cause pool balls to drop. The Challenger LED 1 light may light up solid. When a time that may be set on the board by the owner of machine 305 has expired, the Challenger LED 1 may flash and a ball gate of machine 305 may close. The ball gate may not open up until cash or an App (e.g., via payment device 330) has been applied. Also the Challenger 2 LED may not light up solid until challenger 2 pays and then the challenger 1 LED may stop flashing. For example, once the challenger 1 LED stops flashing and the Challenger 2 LED lights up solid, then users know that Challenger 2 has paid.

In at least some exemplary embodiments, display assembly 320 that may be a challenge board may include an eight ball forgiveness LED that may light up once money or an app credit is vended. Eight ball forgiveness may light up solid on either settings (e.g., straight pool or timed play) if the owner of the table has selected for it to be turned on. Next to (e.g., vertically next to) the eight ball LED may be a place for a sticker to let challengers know that the table has eight ball forgiveness available and active.

In at least some exemplary embodiments, display assembly 320 that may be a challenge board may include low battery level LEDs for power storage 340, which may provide notification to system operators to connect (e.g., plug in) power connector 345 to power source 350. The exemplary disclosed system may also include app monitoring of power storage 340 (e.g., battery levels), which may provide an owner or operator of machine 305 with real time alerts to charge or change power storage 340 and/or batteries of machine 305. By using the flashing LEDs as an indication for when a battery is low, a patron could also make the location aware that a table should be plugged in (e.g., as illustrated in FIG. 1). The LEDs lighting up when power storage 340 may be nearing unrecoverable battery levels may save the operator from expensive battery replacement costs. Display assembly 320 may also include audio alarms to notify users of low batteries. If a main battery of display assembly 320 or tracking system 310 drops to a low level, the board may disconnect the battery from a circuit and flip over to another power storage (e.g., cue ball laser battery) until the main battery is charged or replaced. Also for example, machine 305 may be plugged into a power source and no batteries may be involved.

In at least some exemplary embodiments, display assembly 320 that may be a challenge board may provide for Free Game Challenge (FGC) Rules. Silk screened numbers 1 to 8 may be printed vertically in order on a chalk board or lit eraser marker board. Any other suitable printing technique may also be used. Players may put their name next to each number to correspond to the numbers on the FGC. Instructions and rules of the FGC may also be silk screened on the chalk board. By combining the LED challenger lights described above and the FGC, an order of play may be tracked and organized. The LED may give the next challenger the option to start the Pool table (e.g., initiate operation as described for example at step 415) with an app or coins (e.g., quarters) or currency. The FGC may also be used to create the order of challengers and to continue the order of play. For example, during a busy night of pool table play, customers may put their names on the chalk board next to the corresponding number on the FGC. Then customers may also place one quarter on their number on the FGC game board on display assembly 320 that may be the Challenger player unit. When some or all of the numbers are taken, the first player on the table that already has the table may be challenged by Challenger 1. If Challenger 1 wins then he or she may leave a marker (e.g., quarter) on Number 1. Then Challenger 2 may challenge Challenger 1. If Challenger 1 loses then he or she may take his or her quarter from the Challenger 1 slot and put it on the free game slot. If Challenger 2 wins again against Challenger 3, then Challenger 2 may leave his or her marker (e.g., quarter) on 2 again. Challenger 3 may then place his or her quarter on the Free Game slot. For example, if Challenger 2 wins all of his or her games, all eight marker (e.g., quarters) may be theirs for a free game or he or she may take the quarters if there are no more challengers.

In at least some exemplary embodiments, display assembly 320 that may be a challenge board may provide for Tournament Play. On a side (e.g., the left side) of a Challenger Player Unit there may be a key switch that may connect to display assembly 320 that may be the Challenger board. Below that key switch may be another coin meter. If machines 305 that may be pool tables are placed in a tournament, a tournament feature may be turned on with the key switch, which may allow the pool balls to drop without any app or cash vend. The player may push an "8, 9, and 10 ball forgiveness" button to drop the pool balls to start a next game. The balls may then be locked in the pool table until the button is pushed again. Tracking device 335 that may be a coin meter disposed under operation assembly 315 that may be a switch may count every time the balls are dropped. If there is an app connected to display assembly 320 that may be a board then the app may record (e.g., capture) every time the balls dropped also. A predetermined fee may be agreed on to charge a person or entity running a Tournament, so the owner of machines 305 (e.g., the pool tables) may generate revenue. This feature may work with greens fee tournaments also. In at least some exemplary embodiments, a first operator may own machine 305 and a second operator (e.g., or the same operator) may own tracking system 310 that may be installed on machine 305.

The tournament feature may also be used with pool league night instead of using an app. A location hosting machines 305 may be charged (e.g., half price) every time an operation of operation assembly 315 is initiated (e.g., the balls drop). By using tracking device 335 (e.g., the meter on the player unit) the vendor may charge the location for league play. The Tournament feature may also be used in pool halls so a customer may be charged per game without any money or app fee being paid directly. For example, a pool hall may still charge a fee per player or charge a fee per every time operation assembly 315 is initiated (e.g., the balls are dropped).

A combination of some or all of the exemplary disclosed functions (e.g., on a "BarZcash" system) in the use of the exemplary disclosed app, including using display assembly 320 (e.g., LEDs on the Challenger board) and the FGC to control pool play and player order. The exemplary disclosed system and method may provide a technique for tracking and monetizing league pool play.

In at least some exemplary embodiments, the exemplary disclosed system and method may also provide a ball forgiveness feature for a commercial pool table for example by using a push button switch. Once players know that one of the three balls go in (e.g., 8, 9 or 10) they may push the forgiveness button and activate operation assembly 315 (e.g., drop the balls) again. If the game is set on straight pool, for example, the forgiveness button may be pushed a single time. There may be a 10 minute time period (e.g., or any other desired time period), so if a forgiveness LED (e.g., on display assembly 320) goes out then time has run out and the forgiveness button will not work anymore. The three balls may be used in three different games (e.g., classic eight ball, nine ball and ten ball). For example, the exemplary disclosed system (e.g., including apps) may provide for adjustable play times and tracking every game on tracking device 335 (e.g., an electromechanical coin meter) so that an operator (e.g., of tracking system 310 and/or machine 305) may charge a fee per a game to a location owner. Also, league players may be charged at a reduced price instead of not paying anything.

In at least some exemplary embodiments, the exemplary disclosed system and method may also include display assembly 320 that may be a Universal board having many settings. Users can enter input to system 300 to have a pool table sense the 8, 9, and 10 ball or use a manual push button switch. This may give a player another game free of charge. This option may be designed so that the pool table price can be raised to cost more money than traditional pricing. Also for example, if a pool game is set up on a 5 minute game (or any other desired time) and an 8 ball goes in after 5 minutes expires, then the balls will not release. A tournament setting may also be combined with a forgiveness setting so that every time an 8, 9, or 10 ball goes in a pocket, depending on the selected game, the balls will drop and the customer may push the button once the 8, 9, 10 ball are sunk in the game. After the balls drop, the ball gate may go down again until the button is pushed again. For accounting and collecting revenue, tracking device 335 may keep track of each initiation of operation assembly 315 (e.g., every time the balls drop). By having tracking device 335 count games, a predetermined fee for the location owner to pay could be agreed upon (e.g., based on tracking device 335 that may be a coin meter, for example when a tournament is set up for green fees instead of putting money in the table). Every time the ball gate goes up may be tracked on the exemplary disclosed app. The tournament feature may also be used in pool halls, which may charge by the hour. The customer may also choose to pay a minimum fee and be charged per each time operation assembly 315 operates (e.g., every time the ball gate drops the balls). This may be controlled by the app, so if the customer chooses a minimum fee then it would start the table with the app.

In at least some exemplary embodiments, the exemplary disclosed system and method may provide for PayRange, Touch Tunes, and/or AMI application Integration with a BarZcash Universal Board and Retro Kit System. With the production of the BarZcash Universal board for the PayRange app, Touch Tunes app, and/or AMI juke box app, a wide array of opportunities may be taken advantage of on Pool Tables, Amusement machines, and other machines. The universal board may be to create a way to channel pool league players to use PayRange, Touch Tunes and/or AMI applications to start pool tables and track the pool table plays. With the exemplary disclosed universal board, league players may be charged at a reduced price and the operator of machines 305 may recover some payment for the maintenance of the pool tables. For example, every vended app, cash, free game and tournament play may be counted by tracking device 335 that may be an electromechanical coin meter. In doing so, the operator may charge for an app connection fee and keep track of some or every vending event. For example, an operator may pay BarZcash a monthly fee or a percentage of each vend (e.g., app fees may be taken out of the app vends automatically). If no app is connected to machine 305 (e.g., a pool table), tracking device 335 (e.g., a challenger coin meter) may be used to charge a pool table location or tournament manager at a predetermined fee per drop of the balls by the Challenger player ball drop button. Also for example, the 8, 9, and 10 ball forgiveness option may be turned on as described for example above to generate additional revenue per pool game.

In at least some exemplary embodiments, an operator of system 300 may set up apps for sharing between Touch Tunes, PayRange, and/or AMI. The operator may set up incentives for other machines co-located with machine 305 (e.g., pool tables, arcade games, jukeboxes, and any other suitable device located in a given location) such as buying 5 songs on a juke box to get a free game of pool or discounted game of pool (e.g., or any other offer or benefit).

In at least some exemplary embodiments, if power storage 340 that may be a battery (e.g., for a board of tracking device 335) is disconnected, batteries (e.g., "D" Cell batteries) that power a laser eye (e.g., cue ball laser eye) may automatically switch to power the board. Also for example, a 12 volt wall charger may be plugged into power storage 340. Also, a 12 volt charger may be plugged into the board (e.g., to bypass or avoid use of batteries).

In at least some exemplary embodiments and as illustrated in FIG. 1, a sensor 360 (e.g., a motion sensor or any other suitable sensor such as a light sensor) may turn on power to a PayRange, Touch Tunes, and/or AMI app unit via tracking device 335 and/or relay 325. Motion sensor 360 may be disposed on a Challenger board of machine 305. If no motion is detected for 30 minutes after any app credit or money is inserted or provided, system 300 (e.g., including apps) may power off to conserve power of power storage 340 (e.g., battery life). The motion sensor may be controlled by controller 355 and/or tracking device 335.

In at least some exemplary embodiments and as illustrated in FIG. 1, system 300 may include a solar battery charging system. For example, one or more solar panels 365 may be placed on an angle on the sides of machine 305 (e.g. a pool table) under the skit of the rail so as to not get in way of players. Solar panels may also be located in rails for charging power source 340 (e.g., or other batteries of machine 305).

In at least some exemplary embodiments, display assembly 320 may include a challenger phone charging erasable chalk board (e.g., with app). The Challenger phone charging chalk board may have similar features as the exemplary disclosed Challenger Player unit described above, and may include a quarter rack with the one through eight quarter slots so that it may also be used with other gaming machines like Fosse ball, Shuffle Board and darts. The exemplary disclosed phone charging chalk board may maintain a player order and have a chalk board attached to it where one to eight players may write their names to maintain order of play. The exemplary disclosed phone charging chalk board may include an app on board that may power USB charger ports so players may charge their phones. A wireless charging spot may also be on the unit. The chargers may activate (e.g., power or turn on) via an app and have a timed limit before payment (e.g., another payment) would be made. This may also be sponsored by a company that would like to advertise and not charge the players for charging. For example, advertisers, may have the players go to a website to get the charger to turn on for free or offer a discounted price. There also may be an added shelf to the Challenger Player Unit so that two or three phones may rest on the shelf to get charged. The exemplary disclosed unit may plug in (e.g., into A/C or AC power) and also be adjustable to a size of the chalk board that may fit on it.

In at least some exemplary embodiments, the exemplary disclosed system and method may include a tracker (e.g., a Barzcash Universal Board Vaultracker) for automated teller machines (ATM). The exemplary disclosed system and method may include a universal board (e.g., similar to a board of tracking device 335 as described for example herein) that may track employee arrival and leaving times from ATM locations and track ATMs that have been stolen. The exemplary disclosed system and method may include a battery backup that may be activated once an ATM is disconnected from power (e.g., from AC electricity or power). When AC power is on, a relay (e.g., similar to relay 325) to the battery backup may be open. A relay coil may be pulled to maintain power being provided to the board (e.g., similar to a board of tracking device 335 as described for example herein). Once AC to the ATM turns off, the coil relaxes and puts a DC source (e.g., between 9 volts DC and 24 volts DC) to the app and the universal board. After this occurs, an app of the exemplary disclosed system may be activated to record what happens before or while the ATM is not powered (e.g., unplugged from AC power). Any opening of the Vault door (e.g., main door for paper) and/or other electronic accessibility normally accessed by service technicians will be measured and counted by the app of the exemplary disclosed system (e.g., a time of opening and a time of closing of the door or other access point). There may also be an interlock switch mounted to a fastener (e.g., stud) that may secure the ATM to the ground. If the ATM is removed from its location (e.g., the fastener connection is broken or removed), the exemplary disclosed system may measure and record on when it happened and any other desired information.

In at least some exemplary embodiments, an ATM employee may arrive at a location. When the employee open the vault door, the exemplary disclosed system may record that time. When the employee closes the door, the exemplary disclosed system may record that time. If the employee opens a top door to load paper at that time, the exemplary disclosed system may record data of that activity. When the employee is done servicing the ATM, the employee may perform a transaction (e.g., on the app) to activate the universal board (e.g., similar to a component of tracking device 335). All of the times and data that were recorded may be processed by the exemplary disclosed system (e.g., may be sent to system apps online so a manager may check the progress of the employee). For example, the exemplary disclosed system may accordingly detect an activity in which a person knows a combination of the ATM and unplugs the ATM before the person opens the vault door (e.g., the exemplary disclosed system may track the unauthorized vault opening). Based on data provided by the exemplary disclosed system, the manager may request certain timed footage of security system at that location at the time provided by the exemplary disclosed system. The manager may then determine who had opened the ATM in an unauthorized manner. The unauthorized person may also not be aware that the unauthorized access was detected.

The exemplary disclosed system and method may provide an efficient and effective technique for tracking each initiation of machine game play (e.g., release of pool balls) during any desired period such as a league play period or free play period. The exemplary disclosed system and method may also allow audits of a machine such as a pool table to be viewed online via an operation of the system. The exemplary disclosed system and method may also allow advertisements to be displayed and sold on the exemplary application to sponsor pool league players. The exemplary disclosed system and method may also allow discounted games to be offered to desired users such as pool league players.

Figure 5:
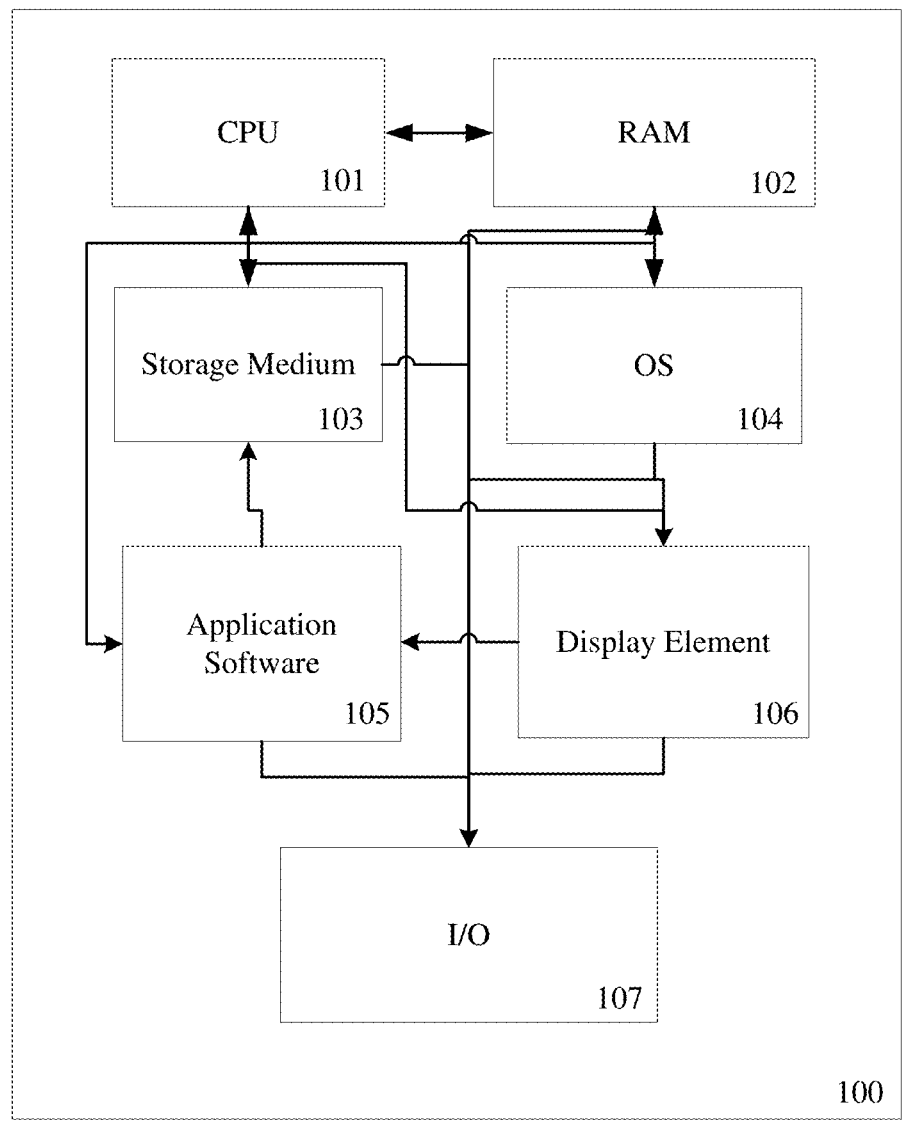
FIG. 5 is a schematic illustration of an exemplary computing device, in accordance with at least some exemplary embodiments of the present disclosure.

An illustrative representation of a computing device appropriate for use with embodiments of the system of the present disclosure is shown in FIG. 5. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 6, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 6:
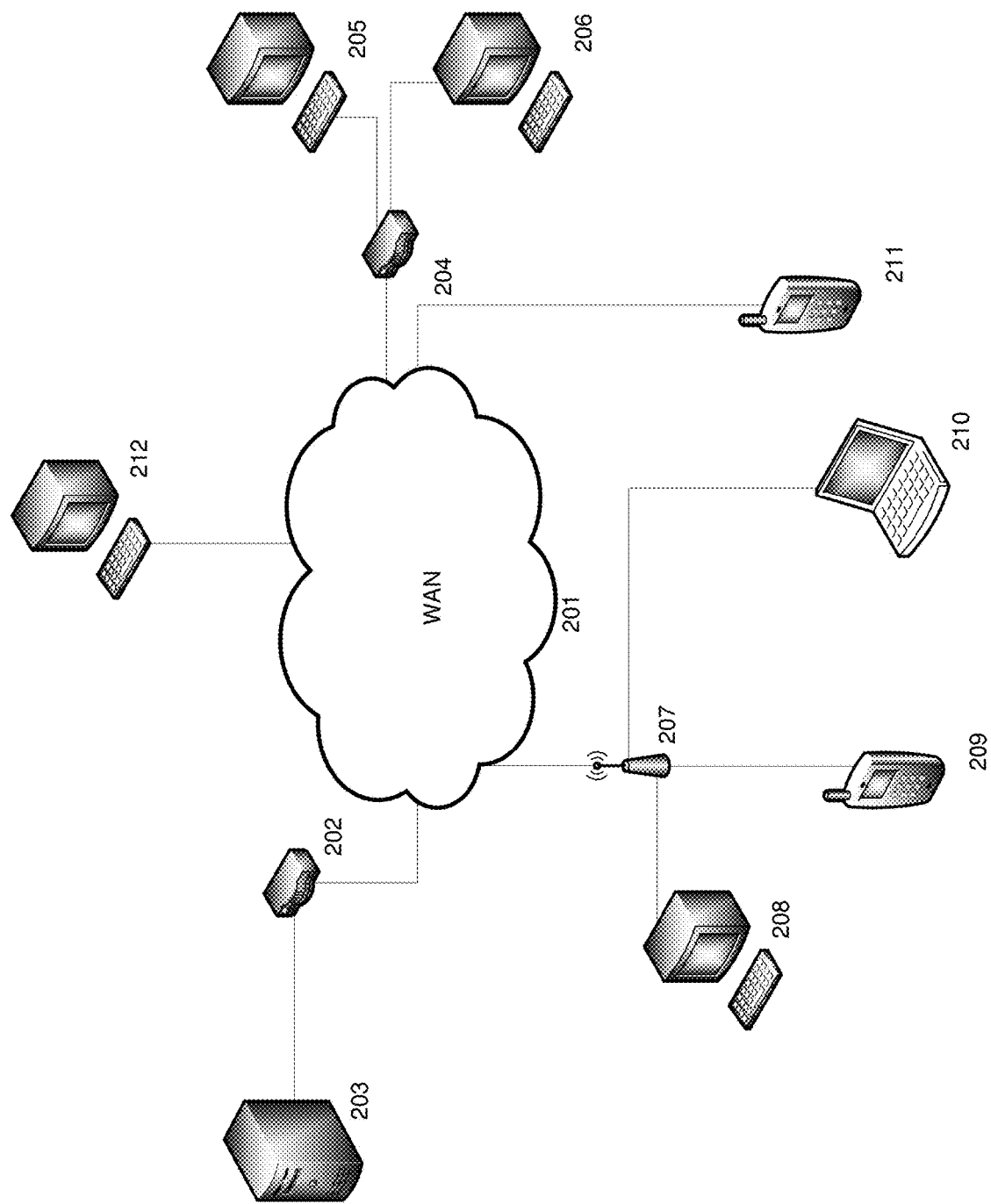
FIG. 6 is a schematic illustration of an exemplary network, in accordance with at least some exemplary embodiments of the present disclosure.

Referring to FIG. 6, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 6, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 7:
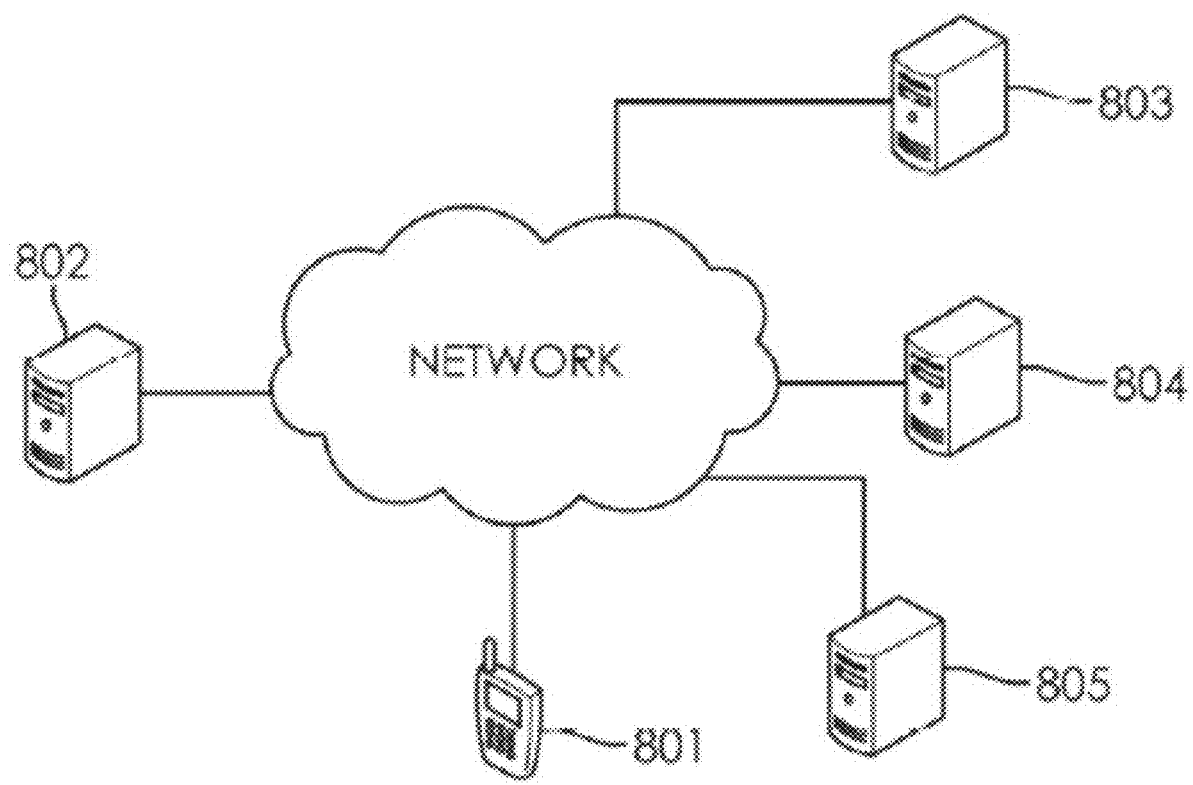
FIG. 7 is a schematic illustration of an exemplary network, in accordance with at least some exemplary embodiments of the present disclosure.

Turning now to FIG. 7, a continued schematic overview of a cloud-based system in accordance with an embodiment of the present invention is shown. In FIG. 7, the cloud-based system is shown as it may interact with users and other third party networks or APIs. For instance, a user of a mobile device 801 may be able to connect to application server 802. Application server 802 may be able to enhance or otherwise provide additional services to the user by requesting and receiving information from one or more of an external content provider API/website or other third party system 803, a constituent data service 804, one or more additional data services 805 or any combination thereof. Additionally, application server 802 may be able to enhance or otherwise provide additional services to an external content provider API/website or other third party system 803, a constituent data service 804, one or more additional data services 805 by providing information to those entities that is stored on a database that is connected to the application server 802. One of ordinary skill in the art would appreciate how accessing one or more third-party systems could augment the ability of the system described herein, and embodiments of the present invention are contemplated for use with any third-party system.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

In at least some exemplary embodiments, the exemplary disclosed system may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. A tracking apparatus for a machine having an operation assembly, comprising:
   an electric relay configured to be connected to the operation assembly;
   a tracking device that is connected to the electric relay; and
   an electronic payment device that is connected to the electric relay;
   wherein the electric relay is configured to transfer a first electrical pulse from the operation assembly to the tracking device;
   wherein the electric relay is configured to transfer a second electrical pulse from either the electronic payment device or the operation assembly to the tracking device; and
   wherein the electric relay transfers the first electrical pulse or the second electrical pulse when the operation assembly performs an operation.

2. The tracking apparatus of claim 1, wherein the first and second electrical pulses are 12 volt DC electrical pulses.

3. The tracking apparatus of claim 1, wherein the electric relay is a 12 volt electric relay.

4. The tracking apparatus of claim 1, wherein the electric relay is a double pole double throw relay.

5. The tracking apparatus of claim 1, wherein the electronic payment device is selected from the group consisting of a PayRange Blue Key Plus device, a Pay Range Blue Key Smart device, a Touch Tunes device, and an AMI device.

6. The tracking apparatus of claim 5, wherein the electronic payment device is connected to the electric relay via a wire being connected from a position on a relay board of the PayRange Blue Key Plus device to the electric relay.

7. The tracking apparatus of claim 6, wherein the relay board is a Pay Range Relay Board part #8856046 and the position on the relay board is a K1 position.

8. The tracking apparatus of claim 1, further comprising a deep cell battery that is electrically connected to the tracking device.

9. The tracking apparatus of claim 8, wherein the deep cell battery is a 12 volt DC battery.

10. The tracking apparatus of claim 1, further comprising a display board configured to be disposed on the machine, the display board including a plurality of light-emitting diodes.

11. The tracking apparatus of claim 1, wherein the tracking device is a 5 to 24 volt DC coin counter.

12. The tracking apparatus of claim 1, wherein the tracking device is selected from the group consisting of a pool table tracking device and an automated teller machine tracking device.

13. A method, comprising:
providing an operation assembly of a game machine;
connecting an electric relay to the operation assembly;
connecting a tracking device to the electric relay;
connecting an electronic payment device to the electric relay;
transferring a first electrical pulse from the operation assembly to the tracking device via the electric relay;
transferring a second electrical pulse from either the electronic payment device or the operation assembly to the tracking device via the electric relay; and
transferring the first electrical pulse or the second electrical pulse when the operation assembly releases at least one playing object of the game machine.

14. The method of claim 13, wherein the operation assembly includes a pool table switch that releases at least one playing object that is a plurality of pool balls of the game machine that is a pool table.

15. The method of claim 13, wherein the operation assembly includes a mechanical push slot of the game machine that is a pool table.

16. The method of claim 13, further comprising connecting a battery to the tracking device, and selectively connecting the battery to an electrical outlet via an electrical wire.

17. A pool table machine, comprising:
a pool ball release switch;
an electric relay that is connected to the pool ball release switch;
a tracking device that is connected to the electric relay; and
an electronic payment device that is connected to the electric relay;
wherein the electric relay is configured to transfer a first electrical pulse from the pool ball release switch to the tracking device;
wherein the electric relay is configured to transfer a second electrical pulse from either the electronic payment device or the pool ball release switch to the tracking device; and
wherein the electric relay transfers the first electrical pulse or the second electrical pulse when the pool ball release switch releases a plurality of pool balls from a cavity of the pool table machine.

18. The pool table machine of claim 17, wherein the electric relay is a 12 volt double pole double throw relay.

19. The pool table machine of claim 17, wherein the electronic payment device is selected from the group consisting of a PayRange Blue Key Plus device, a Pay Range Blue Key Smart device, a Touch Tunes device, and an AMI device, and is connected to the electric relay via a wire being connected from a position on a relay board of the electronic payment device to the electric relay.

20. The pool table machine of claim 19, wherein the relay board is a Pay Range Relay Board part #8856046 and the position on the relay board is a K1 position.

* * * * *